(12) United States Patent
Ueyama et al.

(10) Patent No.: US 7,756,640 B2
(45) Date of Patent: Jul. 13, 2010

(54) VEHICLE CONTROL SYSTEM, VEHICLE CONTROL METHOD, AND VEHICLE CONTROL PROGRAM

(75) Inventors: Mikio Ueyama, Tokyo (JP); Masao Sakata, Zama (JP)

(73) Assignees: Hitachi, Ltd., Tokyo (JP); Xanavi Informatics Corporation, Zama-shi (JP)

( * ) Notice: Subject to any disclaimer, the term of this patent is extended or adjusted under 35 U.S.C. 154(b) by 533 days.

(21) Appl. No.: 11/839,269

(22) Filed: Aug. 15, 2007

(65) Prior Publication Data

US 2008/0077283 A1    Mar. 27, 2008

(30) Foreign Application Priority Data

Sep. 26, 2006   (JP)   ............... 2006-261201

(51) Int. Cl.
  *G01C 21/00*   (2006.01)
  *G01C 21/30*   (2006.01)
(52) U.S. Cl. ...................... 701/221; 701/206
(58) Field of Classification Search ............ 701/200
  See application file for complete search history.

(56) References Cited

U.S. PATENT DOCUMENTS

| 6,282,492 | B1 * | 8/2001 | Gorai et al. | ............... 701/209 |
| 2002/0069014 | A1 * | 6/2002 | Ranjan | ............... 701/202 |
| 2005/0114014 | A1 * | 5/2005 | Isaac | ............... 701/204 |
| 2005/0261831 | A1 * | 11/2005 | Irie | ............... 701/211 |
| 2006/0224316 | A1 * | 10/2006 | Ishida et al. | ............... 701/211 |
| 2007/0005218 | A1 | 1/2007 | Ueyama | |
| 2007/0192013 | A1 | 8/2007 | Bando et al. | |
| 2008/0167802 | A1 * | 7/2008 | Yoshioka et al. | ............ 701/201 |
| 2008/0177462 | A1 * | 7/2008 | Yoshioka et al. | ............ 701/200 |

FOREIGN PATENT DOCUMENTS

JP   2005-132291 A   5/2005

OTHER PUBLICATIONS

European Search Report dated Nov. 27, 2008 (five (5) pages).

* cited by examiner

*Primary Examiner*—Thomas G Black
*Assistant Examiner*—Shelley Chen
(74) *Attorney, Agent, or Firm*—Crowell & Moring LLP

(57) ABSTRACT

A vehicle control system includes a route setting unit for setting a route from a start point to a destination; an information obtaining unit for obtaining from a memory position information of at least one base point and at least one control point existing in the route set by the setting unit; a base point recognition unit for recognizing that a current position of a vehicle reaches a position of the base point obtained by the obtaining unit; a running situation monitoring unit for determining as a predetermined distance a running distance from the base point most lately recognized by the recognition unit; and a control unit for executing an advanced control to the vehicle if the predetermined distance obtained by the monitoring unit is shorter than any of first and second threshold distances, when the current position reaches a position of the control point obtained by the obtaining unit.

9 Claims, 15 Drawing Sheets

FIG.2A

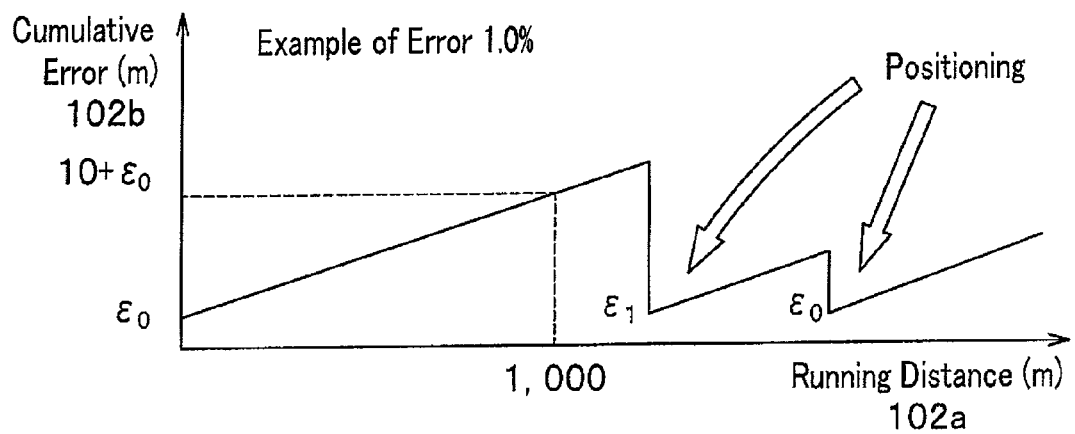

FIG.2B

| Running Distance (m) 102a | Cumulative Error (m) 102b | Control Application Example Applicable After Running Predetermined Distance (in a case of $\varepsilon = 0$) 102c | | |
|---|---|---|---|---|
| | | Speed Limit Running | Deceleration at Curve | Stop at Stop Line |
| 100 | $1+\varepsilon$ | O | O | O |
| 200 | $2+\varepsilon$ | O | O | O |
| 400 | $4+\varepsilon$ | O | O | X |
| 800 | $8+\varepsilon$ | O | O | X |
| 1,000 | $10+\varepsilon$ | O | O | X |
| 2,000 | $20+\varepsilon$ | X | X | X |

O ··· Permission
X ··· No Permission

FIG.6A

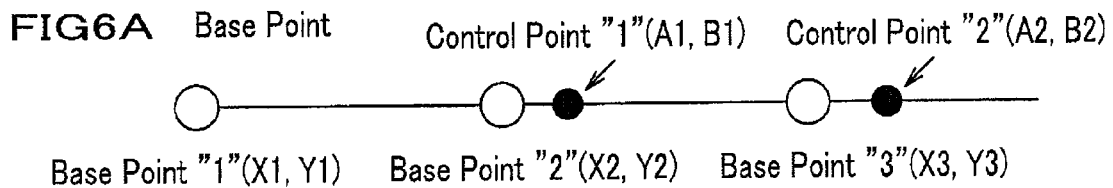

Base Point

Control Point "1"(A1, B1)   Control Point "2"(A2, B2)

Base Point "1"(X1, Y1)   Base Point "2"(X2, Y2)   Base Point "3"(X3, Y3)

FIG.6B  Structure Example of Base Point Data — 303

| Position (X1, Y1) of Base Point "1" |  |
| --- | --- |
| Ground Object Type at Base Point "1" |  |
| Position (A1, B1) of Control Point "1" |  |
| Control Content of Control Point "1" |  |
| Way to Control Point "1" |  |
| Assumed Running Route "1" (Between Coordinates of Two Points) | Width of Assumed Running Area "1" |
| Assumed Running Route "2" (Between Coordinates of Two Points) | Width of Assumed Running Area "2" |
| Assumed Running Route "n" (Between Coordinates of Two Points) | Width of Assumed Running Area "n" |

— 303

| Position (X2, Y2) of Base Point "2" |  |
| --- | --- |
| Ground Object Type at Base Point "2" |  |
| Position (A2, B2) of Control Point "2" |  |
| Control Item of Control Point "2" |  |
| Way to Control Point "2" |  |
| Assumed Running Route "1" (Between Coordinates of Two Points) | Width of Assumed Running Area "1" |

FIG 7A  Object and Recognition Means at Base Point

| Object at Base Point | Environment Recognition Sensor |
|---|---|
| Road Sign<br>• Stop Line<br>• Pedestrian Crossing<br>• Traffic Classification | • Front Recognition Video Camera<br>• Rear Recognition Video Camera |
| Road Sign Board | Front Recognition Video Camera |
| Beacon | VICS (registered trademark) Receiver |

FIG 7B  Recognition Means at Base Point

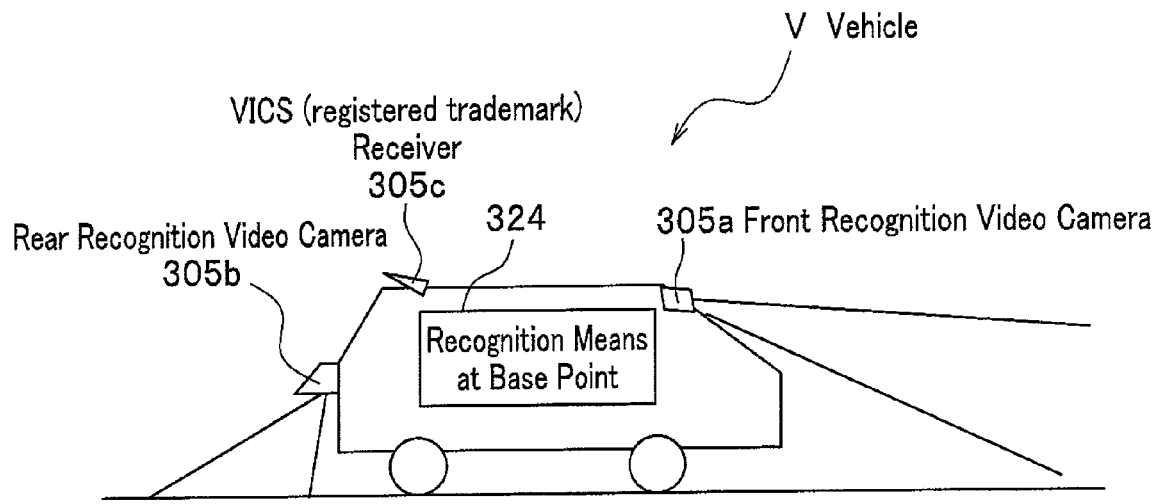

Vehicle Current Position

Assumed Running Route (Start Point) — Assumed Running Route (End Point)

Area of Triangle $= a \times$ Vertical Line Length$/2$
$= \sqrt{s(s-a)(s-b)(s-c)}$,
here, $s = (a+b+c)/2$,
accordingly, Vertical Line Length $= 2 \times \sqrt{s(s-a)(s-b)(s-c)}/a$, or using a vector product, Vertical Line Length $= |\vec{a} \times \vec{b}|/|\vec{a}|$ FIG.11A  Straight Line
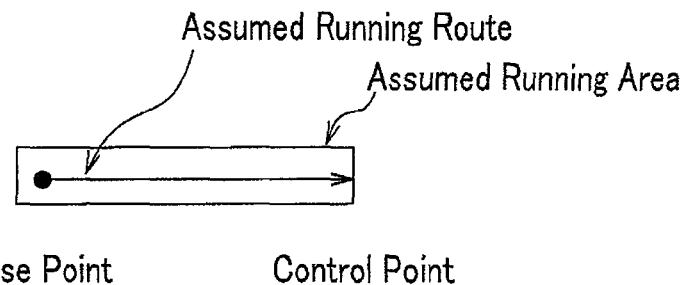
FIG.11B  Intersection
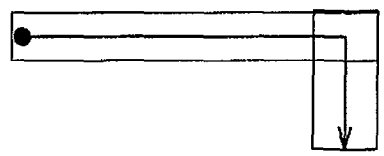
FIG.11C  Curve
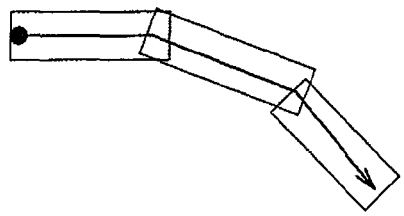
FIG.11D  T Junction
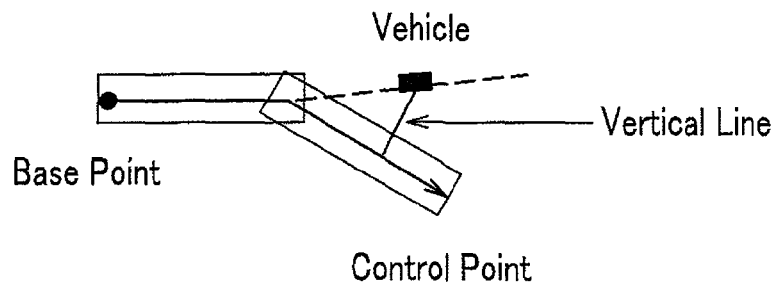

| Design Speed(km/h) | Curvature Radius(m) | Lateral G |
|---|---|---|
| 120 | 570 (Lower Limit) | 0.20 |
| 100 | 380 (Lower Limit) | 0.21 |
| 80 | 230 (Lower Limit) | 0.22 |
| 60 | 120 (Lower Limit) | 0.24 |
| 50 | 80 (Lower Limit) | 0.25 |
| 40 | 50 (Lower Limit) | 0.25 |
| 30 | 30 (Upper Limit) | 0.24 |
| 20 | 15 (Upper Limit) | 0.21 |

Design Speed = $\sqrt{\text{Curvature Radius} \times \text{Lateral G}}$

VEHICLE CONTROL SYSTEM, VEHICLE CONTROL METHOD, AND VEHICLE CONTROL PROGRAM

BACKGROUND OF THE INVENTION

1. Field of the Invention

The present invention relates to a vehicle control system, a vehicle control method, and a vehicle control program.

2. Description of the Related Art

Conventionally, a vehicle control system is studied that automatically determines the control item of a running vehicle, based on a vehicle current position. For example, a system disclosed in Japanese Patent Laid-Open Publication No. 2005-132291 determines a current position of a vehicle according to a radio wave navigation based on the received information of a GPS (Global Positioning System) radio wave and a hybrid navigation based on an autonomous navigation based on information acquired by the vehicle without using the GPS radio wave. Then depending on the likelihood (degree of certainty) of the current position, the system changes the control item of the vehicle.

However, according to the method of using the GPS radio wave, there often occur cases that a driver himself/herself manually drives his/her vehicle, canceling the control of the vehicle when the reception environment of the GPS radio wave becomes worse. Thus the driver is forced to manually drive the vehicle every time when the vehicle control is cancelled, and therefore the usability of the vehicle control is bad.

In addition, in such a case of passing through a high-rise building block, the influence of the GPS accuracy worsening appears due to a radio wave around the vehicle. As a result thereof, such a number of GPS receiving satellites is reduced, and the certainty of a vehicle current position is worsened.

Accordingly, with respect to the accuracy worsening due to the reception environment of the GPS radio wave, because it is not forecasted when the accuracy is worsened, the continuity of the vehicle control cannot be kept and there is no way other than canceling the vehicle control. Although a method of simulating an operation situation of a GPS satellite in advance can also be thought, in practical it is not realistic, considering the influence of multi-paths due to the reflection and the ever-changing of a real environment in such a real building block.

On the other hand, the method of determining a vehicle current position only by an autonomous navigation without using the GPS radio wave. The autonomous navigation has an advantage of being difficult to be influenced by the receiving environment of the GPS radio wave. However, because the autonomous navigation is the method of accumulating a movement distance calculated from a speed and a direction measured by a driver's own vehicle, an error between a vehicle current position calculated by the autonomous navigation and an original vehicle current position is accumulated as the movement distance becomes longer.

It is not desirable to execute a sophisticated vehicle control when the error is large (in other words, the degree of certainty is bad). Accordingly, when the error is large, a vehicle control should be taken that is not sophisticated such a deceleration. Furthermore, the accuracy of a vehicle current position whose target is a vehicle control is needed to be higher than that of a vehicle current position whose target is the map matching of a car-navi (car navigation).

In the conventional determination method of a driver's own vehicle current position whose target is the map matching, a map display is a precondition; therefore, the vehicle current position is determined, then the processing of the map matching is executed, and the vehicle current position on the map is determined. In the processing of the map matching, because an association between a road on an erroneous map and a running position using the map, there is a possibility that the map matching is forcibly matched with a nearest road. This is because a judgment is conventionally taken that the slight difference of a display position does not become a critical problem since the map display is made the precondition.

Consequently, there is a need for providing a driver with a convenience by broadening the control range of a vehicle control, based on the calculation error of a vehicle current position.

SUMMARY OF THE INVENTION

A vehicle control system of the present invention comprises: a route setting unit configured to set a route from a start point to a destination; an information obtaining unit configured to obtain from a memory means base points and control points of position information existing in the route set by the route setting unit; a base point recognition unit configured to recognize that a vehicle current position of a running vehicle reaches each position of the base points obtained by the information obtaining unit; a running situation monitoring unit configured to determine as a predetermined distance a running distance from a newest one of the base points recognized by the base point recognition unit; and a control unit configured to execute an advanced control to the running vehicle if the predetermined distance determined by the running situation monitoring unit is shorter, when the current position of the running vehicle reaches each position of the control points obtained by the information obtaining unit. Other means will be described later.

In accordance with the present invention a control degree of a vehicle is determined, based on a predetermined distance according to a calculation error of a vehicle current position. Accordingly, by broadening a control range of a vehicle control, it is possible to provide a driver with a convenience.

BRIEF DESCRIPTION OF THE DRAWINGS

FIGS. 2A and 2B are illustration drawings showing a correlation between a running distance and a cumulative error relating to the embodiment.

FIGS. 6A and 6B are illustration drawings showing a structure of base point data relating to the embodiment.

FIGS. 7A and 7B are illustration drawings showing a processing of base point recognition unit relating to the embodiment.

FIGS. 11A, 11B, 11C, and 11D are drawings respectively showing assumed running areas relating to the embodiment.

BEST MODE FOR CARRYING OUT THE INVENTION

Figure 1:
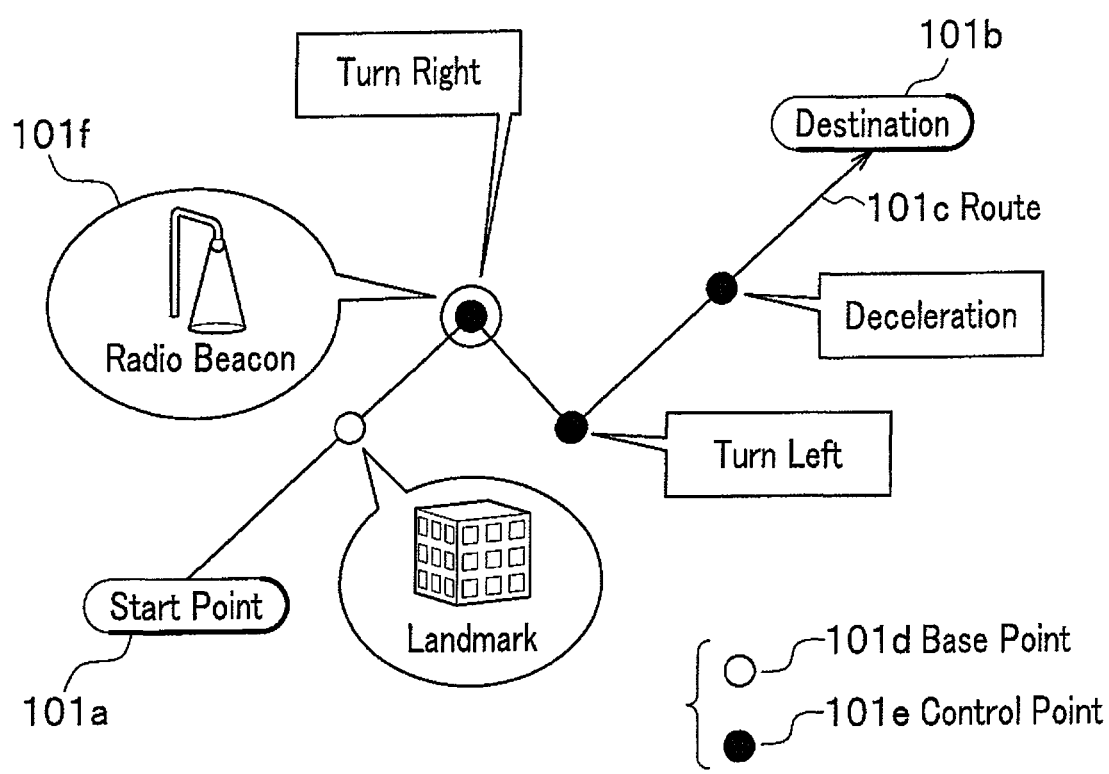
FIG. 1 is an illustration drawing showing an outline of a vehicle control relating to an embodiment of the present invention.

As shown in FIG. 1, a vehicle (not shown) runs along a route 101c from a start point 101a (mainly, a vehicle current position) to a destination 101b. On the route 101c are set at least one base point 101d and one control point 101e, respectively.

The control points 101e are points where a vehicle control is executed when the vehicle reaches there. In FIG. 1 three control points 101e are shown with "●" marks, respectively. When the vehicle reaches the control points 101e, respective vehicle controls of "right turn," "left turn," and "deceleration" are operated.

The base points 101d are points where positioning is executed when the vehicle reaches there. The positioning is to acquire a vehicle current position at each base point 101d by a highly accurate method that is neither an autonomous navigation nor a hybrid navigation, and to set the acquired highly accurate current position as a vehicle current position. A detail of the highly accurate method will be described later as a base point recognition.

For example, in FIG. 1 the two base points 101d are shown with "O" marks, respectively, and when the vehicle reaches each base point 101d, the positioning of the vehicle is executed. In addition, a position of the second base point 101d from the start point 101a is in common with that of the first control point 101e. Thus because a executed operation is independent between each base point 101d and each control point 101e, both positions thereof may match.

In addition, a ground object of each base point 101d is an object that becomes a recognition clue of the base point 101d existing at the base point 101d. For example, the ground object of the first base point 101d is a "landmark," and that of the second base point 101d is a "radio beacon 101f." Furthermore, the ground object may also be adapted to be recognized from image data where a road is photographed by a video camera; for example, a rhombus mark of a white line depicted in front of a pedestrian crossing is one example of ground objects.

Then after the vehicle is positioned at the base point 101d, the vehicle continues to acquire its current positions according to the autonomous navigation of accumulating differences of the current positions from the base point 101d. Accordingly, the shorter a running distance from the base point 101d is, the higher the accuracy of the vehicle current position becomes; thus the smaller the error of the current position becomes. On the other hand, if a running distance from the base point 101d becomes longer, the error of the vehicle current position becomes larger because the error is accumulated.

FIG. 2A is a graph showing a correlation between a running distance 102a and an cumulative error 102b. The longer the running distance 102a in a horizontal axis becomes, the larger the cumulative error 102b in a vertical axis becomes. In addition, the cumulative error 102b is equal to an equation of: cumulative error 102b=running distance 102a×accuracy+residual error ($\epsilon$). Values of $\epsilon$ (for example, $\epsilon_0$, $\epsilon_1$) represent the residual error and are set as, for example, less than 2 m, depending on a positioning method and a position accuracy. If once the positioning is executed, the cumulative error 102b is cleared (0 m) or modified into a value of a smaller residual error.

FIG. 2B is a table showing a correlation between the running distance 102a, the cumulative error 102b, and a content of a vehicle control according to the error 102b. For example, when the running distance 102a is "100 m," the cumulative error 102b is "1+$\epsilon$," and as control application examples, "speed limit running," "deceleration at curve," and "stop at stop line" can be executed.

In addition, as the item of the vehicle control, because needed position accuracy is comparatively rough in the "speed limit running" and the "deceleration at curve," they can be executed until the cumulative error 102b becomes "10+$\epsilon$." On the other hand, because a high position accuracy is needed in the "stop at stop line," it can be executed until the cumulative error 102b becomes "2+$\epsilon$." Thus depending on the value of the cumulative error 102b corresponding to the running distance 102a, it is possible to select a vehicle control executable after the running of a predetermined distance. Thus based on the calculation error of the vehicle current position, it is possible to execute the vehicle control in line with a need.

Thus because the cumulative error 102b becomes larger depending on the running distance 102a, an upper limit of the distance 102a is defined with respect to a vehicle control, where an accurate position control is needed, such as a stop processing at a stop line; In the running distance 102a not less than the upper limit, the vehicle control is stopped. Furthermore, when a plurality of vehicle controls are designated, a vehicle control to be activated is selected according to the running distance 102a.

The control points and the base points thus described are given in advance as additional information to map data. In particular, in such a case of a route being fixed, a proper base point and control point and a control item are defined and reflected in map data, considering the cumulative error 102b in order to be able to achieve the target.

A table 1 below shows a state change of a state change drawing of FIG. 3 in a table format.

TABLE 1

| State | Input | Next State | Output | Comment |
|---|---|---|---|---|
| Autonomous Navigation 1 | Base Point Recognition | Autonomous Navigation 1 | Positioning | Continuation of Autonomous Navigation 1 |
| | Control Point | Autonomous Navigation 1 | Control Execution | Continuation of Autonomous Navigation 1 |
| | Threshold Distance 1 | Autonomous Navigation 2 | State Change | Running Distance Limit |
| | Out of Route | Without Control | State Change | |
| | Vehicle Instable | Without Control | State Change | VDC Activation Timing and the like |
| Autonomous Navigation 2 | Base Point Recognition | Autonomous Navigation 1 | State Change | To Autonomous Navigation 1 |
| | Control Point | Autonomous Navigation 2 | Control Execution | Continuation of Autonomous Navigation 2 |
| | Threshold Distance 2 | Hybrid Navigation | State Change | Running Distance Limit |
| | Out of Route | Without Control | State Change | |
| | Vehicle Instable | Without Control | State Change | VDC Activation Timing and the like |
| Hybrid Navigation | Base Point Recognition | Autonomous Navigation 1 | State Change | |
| | Control Point | Hybrid Navigation | Control Execution | Continuation of Hybrid Navigation |
| | Out of Route | Without Control | State Change | |
| | Difficult to Receive GPS Radio Wave | Without Control | State Change | VDC Activation Timing and the like |
| | Vehicle Instable | Without Control | State Change | |
| Without-Control | Base Point Recognition | Autonomous Navigation 1 | State Change | |

Figure 3:
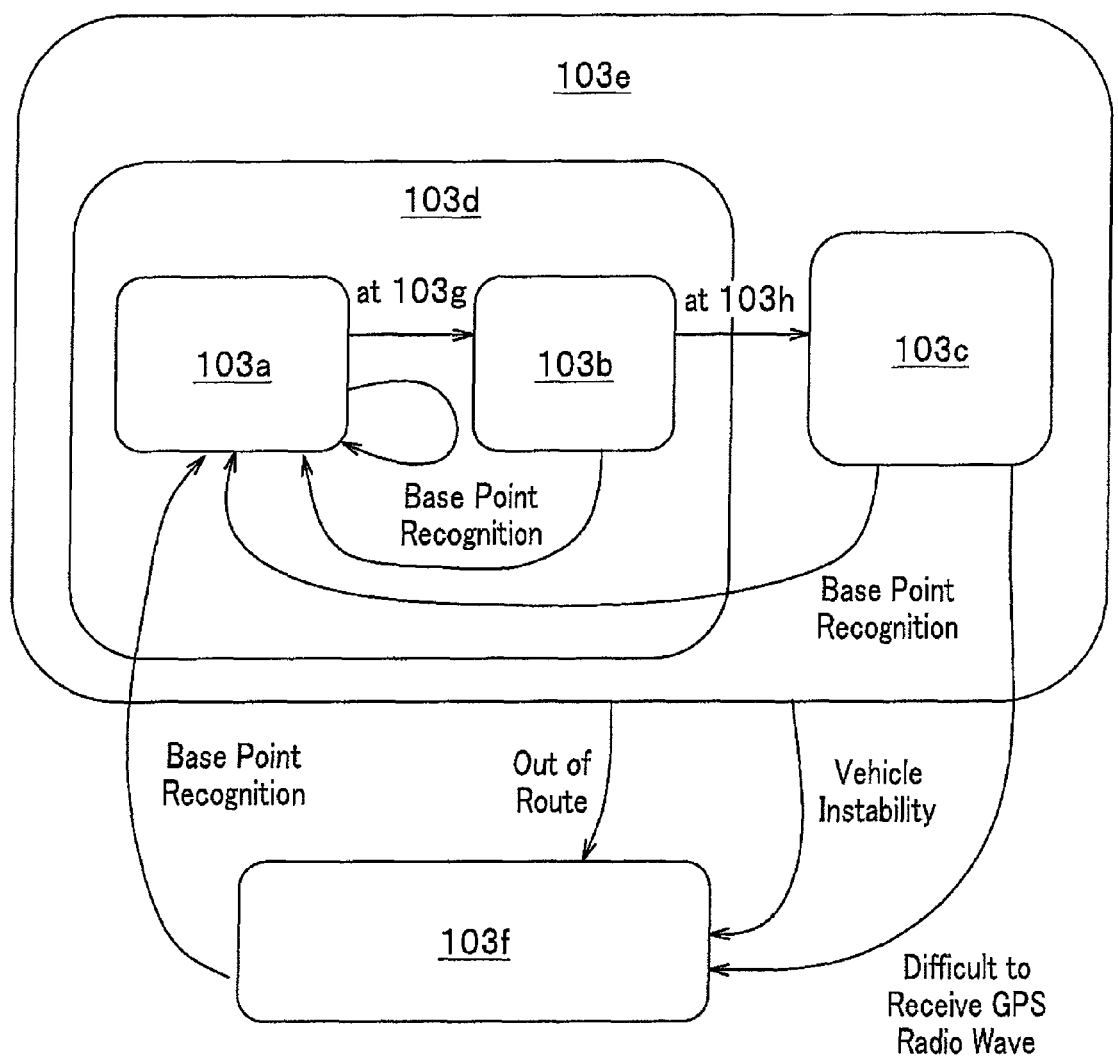
FIG. 3 is a state change drawing showing that a control item is changed according to a running distance from a base point relating to the embodiment.

As shown in FIG. 3, control states are classified into an in-control 103e and a without-control 103f. States of the in-control 103e are classified into an autonomous navigation 103d and a hybrid navigation 103c. States of the autonomous navigation 103d are classified into an autonomous navigation "1" 103a and an autonomous navigation "2" 103b.

An item of an executable vehicle control is associated with each state of the in-control 103e. For example, in the autonomous navigation "1" 103a are executable the vehicle controls of the "stop at stop line" and the "speed limit change." A trigger for changing each state of the in-control 103e is the running distance 102a from a base point.

Firstly, if a base point is recognized, the control state is started from the autonomous navigation "1" 103a. Because in this state the running distance 102a is still short and the cumulative error 102b is also small, it is possible to execute various kinds of vehicle controls such as the "stop at stop line" and the "speed limit change." If the base point vehicle is not recognized, the running distance 102a further increases and reaches a predetermined threshold distance "1" 103g, the control state is changed to the autonomous navigation "2" 103b.

In the autonomous navigation "2" 103b, because the running distance 102a has already increased, such the "stop at stop line" that needs a higher position accuracy is not executed, but a vehicle control such as the "speed limit change" that does not need the higher position accuracy is executed.

If the running distance 102a further increases and reaches a predetermined threshold distance "2" 103h, it is determined that the vehicle has reached the running distance 102a to which the autonomous navigation 103d is not applicable, and the state is changed to the conventional hybrid navigation 103c. In the conventional hybrid navigation 103c is executed a vehicle control such as the "speed limit change" that does not need the higher position accuracy. In the in-control 103e, a new base point recognition is made a trigger, the control state is changed to the first autonomous navigation "1" 103a.

Moreover, in a state of the vehicle being about to spin, a vehicle stabilizing apparatus operates and attempts to avoid the vehicle from spinning. In the vehicle unstable state where the vehicle stabilizing apparatus works, the control state is changed to the without-control 103f, based on a control signal from the apparatus. On the other hand, also when the vehicle current position is out of a route guided by a navigation system 330 (see FIG. 4) and thereby the vehicle runs out of the route, the control state is changed to the without-control 103f. In addition, after the change to the without-control 103f, a base point recognition is made a trigger and the vehicle control of the autonomous navigation 103d is restarted.

Furthermore, in the case of the hybrid navigation 103c, a GPS radio wave is received and a vehicle current position is specified. Consequently, when a number (number of satellites) and radio wave intensity of received GPS radio waves are insufficient, it is difficult to specify the vehicle current position; therefore, the state is changed to the without-control 103f. On the other hand, in the case of the autonomous navigation 103d, the GPS radio wave is not used; therefore, the control state need not be changed. By dynamically changing the navigations for specifying a vehicle current position according to the state changes thus described, it is possible to broaden control ranges (time, item) of the vehicle control, based on the calculation error of the current position, and to provide a driver with a convenience.

For example, in a system where the hybrid navigation 103c is independently used, the control state comes into the without-control 103f when it is difficult to receive a GPS radio wave; therefore, the continuation of the vehicle control cannot be kept. On the other hand, as shown in FIG. 3, in a system where the autonomous navigation 103d is used in combination with the hybrid navigation 103c, the control state does not come into the without-control 103f in the autonomous navigation 103d even when it is difficult to receive a GPS radio wave; therefore, the continuation of the vehicle control can be kept.

In addition, in the state change of the vehicle control a user can check its current state according to the following method in addition to a method of a vehicle control system VCS clearly indicating the current state in its display. The user intentionally turns off the GPS and makes a state in which a GPS signal does not come. If the current state is the hybrid navigation 103c, the vehicle control is canceled due to the reception difficulty of a GPS radio wave. On the other hand, if the current state is the autonomous navigation 103d, the vehicle control is continuously executed, and the operations of the base point recognition and the vehicle control are repeated.

Figure 4:
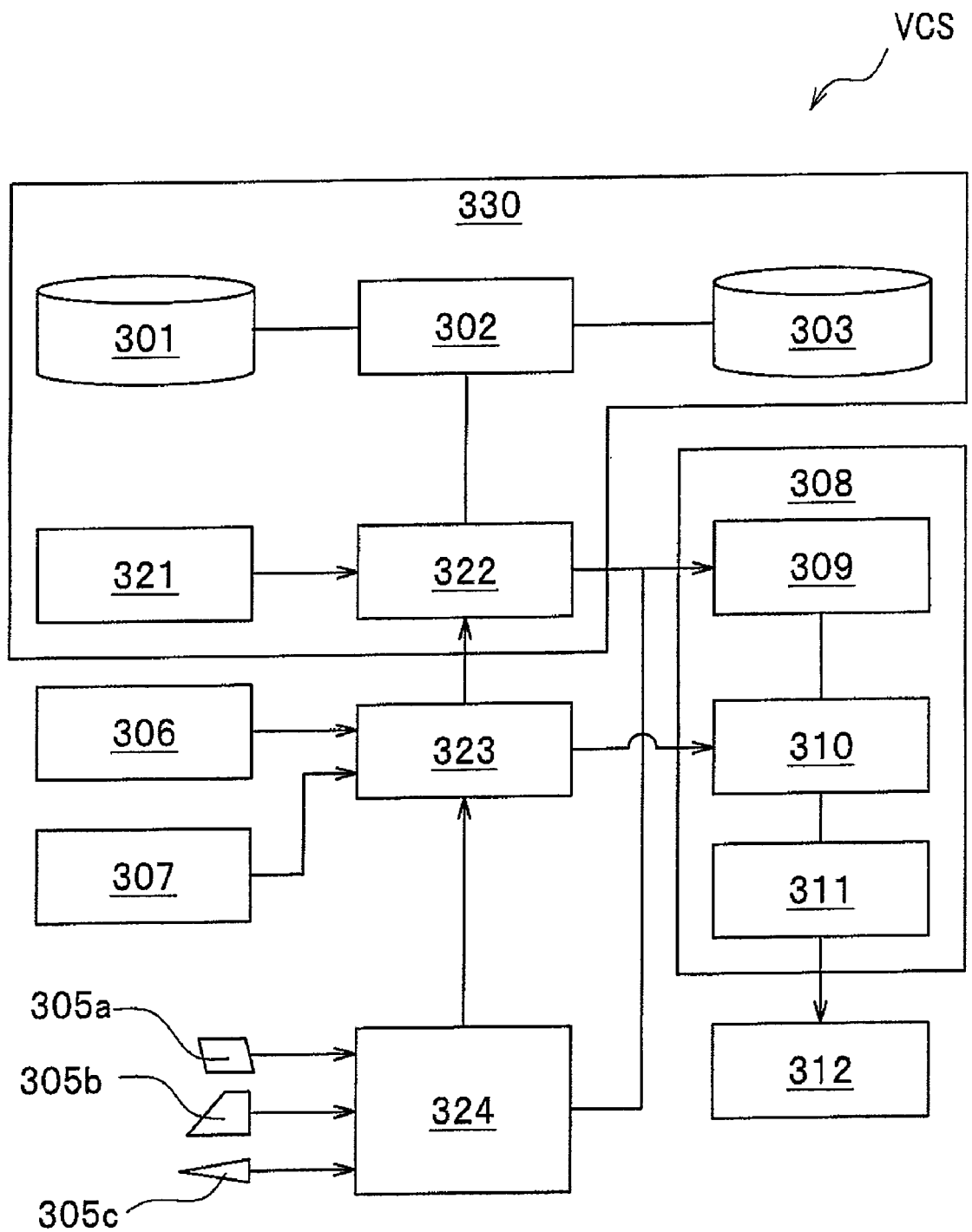
FIG. 4 is a configuration drawing showing a vehicle control system mounted on a vehicle relating to the embodiment.

As shown in FIG. 4, the vehicle control system VCS comprises a map data 301, a route setting unit 302, a map point data 303, a GPS antenna 321, a driver's own vehicle speed detection unit 306, a direction detection unit 307, a front recognition video camera 305a, a rear recognition video camera 305b, a VICS (Vehicle Information and Communication System)® receiver 305c, a hybrid navigation unit 322, an autonomous navigation unit 323, a base point recognition unit 324, a control point information obtaining unit 309, a running situation monitoring unit 310, an actuator control unit 311, and an actuator 312.

In addition, in the embodiment the navigation system 330 comprises the map data 301, the route setting unit 302, the map point data 303, the GPS antenna 321, and the hybrid navigation unit 322. Specifically, in the navigation system 330 the route setting unit 302 sets a route, based on information (such an address) for setting the route input by a user such as a driver. The navigation system 330 indicates in its display: the map data 301 with which the base point data 303 is associated; the route set by the route setting unit 302; and a vehicle current position acquired by the hybrid navigation 322. If the vehicle current position is incessantly updated, the displayed range is scrolled in conjunction with the vehicle current position.

Furthermore, means for recognizing the vehicle current position uses the hybrid navigation unit 322, the autonomous navigation unit 323, and the base point recognition unit 324. The base point recognition unit 324 recognizes a base point based on information acquired by an environment recognition sensor (for example, any one of the front recognition video camera 305a, the rear recognition video camera 305b, the VICS receiver 305c); and thereby recognizes the vehicle current position near the base point (the detail will be described later).

The autonomous navigation unit 323 makes each position of base points as a reference, which the base point is recognized by the base point recognition unit 324; calculates a difference from the position of the base points to the vehicle current position, based on output from the driver's own speed detection unit 306 and the direction detection unit 307; and thereby recognizes the vehicle current position.

The hybrid navigation unit 322 uses the GPS radio wave received by the GPS antenna 321 and the vehicle current position recognized by the autonomous navigation unit 323, and recognizes the vehicle current position.

A control unit 308 comprises the control point information obtaining unit 309, the running situation monitoring unit 310, and the actuator control unit 311. Here, although the actuator control unit 311 is included in the control unit 308, the unit 311 may be provided independently of the control unit 308 or may be stored in another unit, to and from which data is interchangeable, such as any one of the actuator 312 and the base point recognition unit 324.

In addition, the vehicle control system VCS is configured to be a computer comprising: at least a memory as a memory means used in executing a computation processing and a computation processing unit for executing the computation processing. In addition, the memory is configured with such a RAM (Random Access Memory). The computation processing is achieved by executing a program on the memory. The embodiment includes, in addition to the computation processing unit, a program for making the processing unit execute the computation processing and a computer readable recording medium where the program is recorded.

The route setting unit 302 refers to the map data 301 and the base point data 303, and sets a route (S11). The base point recognition unit base point recognition unit 324 executes the base point recognition (S12).

Figure 5:
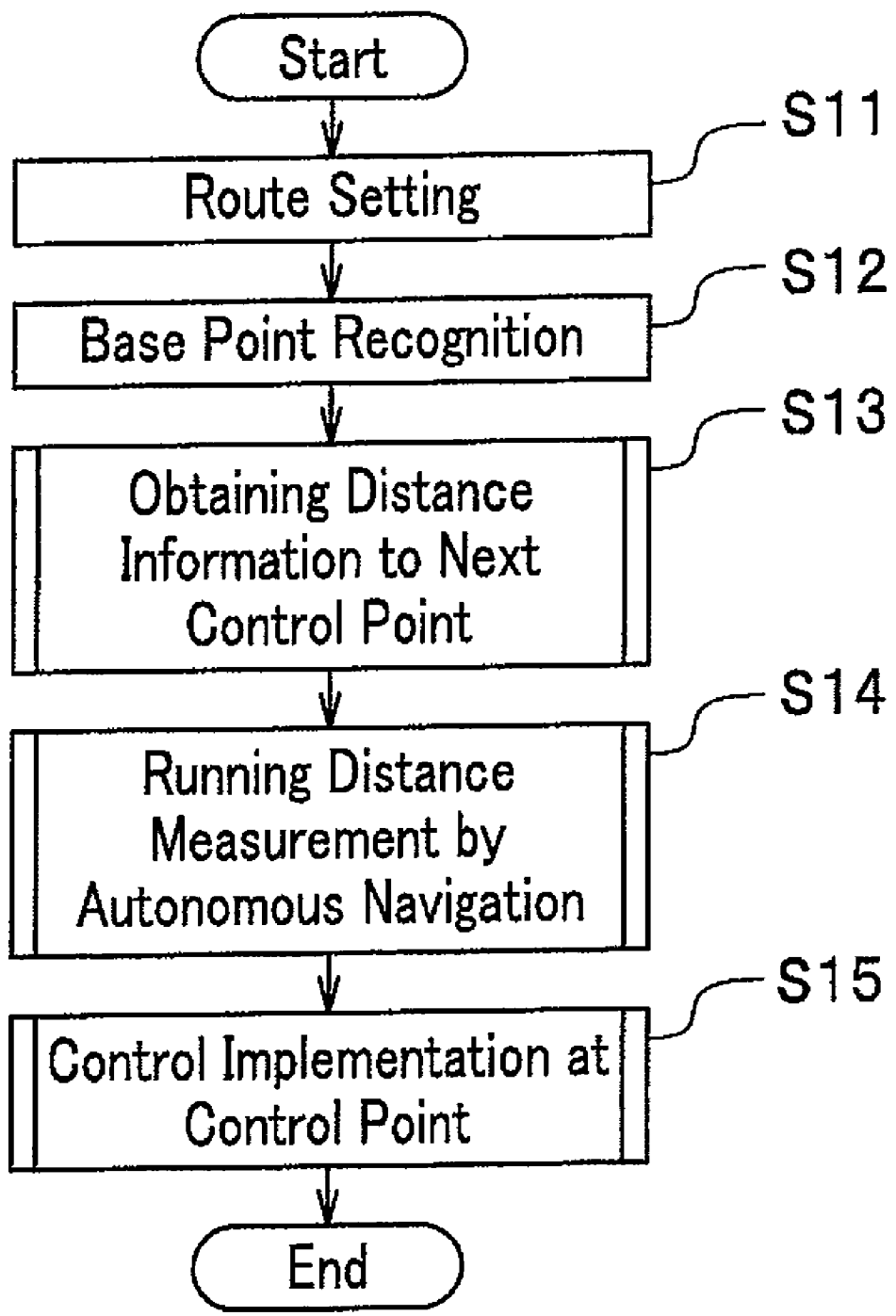
FIG. 5 is a flowchart showing an operation outline of the vehicle control system relating to the embodiment.

The control point information obtaining unit 309 obtains distance information to a next control point (S13). As shown in FIG. 5, the running situation monitoring unit 310 executes a running distance measurement by an autonomous navigation (S14). The actuator control unit 311 executes the vehicle control at the control point (S15). Here will be described each of the processings in detail.

The route setting (S11) will be described. The route setting unit 302 is an input unit for executing the route setting, and a route is fixed by a driver's operation (input of a destination, and a route selection from a plurality of route candidates). Next, the route setting unit 302 searches and determines the information of a base point and a control point existing in the fixed route from the map data 301.

As shown in FIG. 6A, the base point data 303 is represented by two-dimensional coordinates, and there exist a plurality of base points 101d (the alphanumeric code 101d is omitted for simplification in FIG. 6A and hereinafter will be also omitted in FIG. 6B and other drawings, and the description). Furthermore, with respect to each base point, there exists a control point 101e (the alphanumeric code 101e is omitted for simplification in FIG. 6A, and hereinafter will be also omitted in FIG. 6B and other drawings, and the description) corresponding to the base point. That is, the information of a base point is associated with that of a control point existing in a zone between base points.

FIG. 6B is a drawing showing a structure example of the base point data 303. As control point information associated with the base point of the base point data base point data base point data 303, the followings are stored: the position coordinates and control items of the control point; a way (actual distance of a vehicle running between two points, not always the shortest distance) to the control point; the coordinates of two points on an assumed running route; and the width of an assumed running area. The way to the control point is used for an autonomous navigation. A type of a ground object at a recognized base point is used for an application where the cumulative error 102b is cleared or an assumed error is set as a residual error. Furthermore, at that time, it is also available to consider an error (for example, 1 to 2 m) in determining a vehicle current position from a base point position, and to add the error to the residual error. In this connection, the errors are various from a few centimeters to a few meters according to the specifications of instruments similarly to the GPS.

In addition, when a route is fixed, the base point data 303 may be constructed independently from the map data 301. Furthermore, in the data structure example are omitted an index for high speed search, the number of data, and end determination data because they are not directly related to the data structure.

Next will be described the base point recognition (S12).

The base point recognition unit 324 recognizes a road sign board above the ground, a road sign painted on the road, and the like that are respectively recognized as base points by an environment recognition sensor not shown. As the environment recognition sensor, a video camera, a radar, and their combination are used. Furthermore, it is also available to use a communication between vehicles on a road and to receive a beacon position. The environment recognition sensor may be any type of detecting the front or rear of a vehicle in order to recognize the base point.

The outputs of the environment recognition sensor are, for example, the ground object type of a recognized base point, a distance to the base point, a direction toward the base point, and a detected delay time. From the information output by the environment recognition sensor, the base point recognition unit 324 makes the position of a known base point a reference and accurately determines the vehicle current position.

As shown in FIG. 7A, objects at a base point are a stop line, information of a pedestrian crossing, a road sign such as a traffic classification, a road sign board, and a beacon position, wherein the objects are the ground object type. As shown in FIG. 7B, a vehicle V comprises, for example, at least one of the front recognition video camera 305a, the rear recognition video camera 305b, and the VICS receiver 305c as an environment recognition sensor at a base point that is an input in the base point recognition unit 324.

Next will be described the distance information obtaining (S13) to a next control point.

The control point information obtaining unit 309 obtains the current position of the vehicle V from the hybrid navigation unit 322, based on the information of the base point recognition unit 324; and obtains the distance information to the next control point, based on the information of the base point data 303. The hybrid navigation unit 322 is based on a conventional technology and determines the current position of the vehicle V through the navigation 103c that uses the GPS and the autonomous navigation. In addition, the navigation unit 322 is assumed to acquire the information of the autonomous navigation 103d from the autonomous navigation unit 323, and to determine the current position of the vehicle V according to the hybrid navigation 103c.

Figure 8:
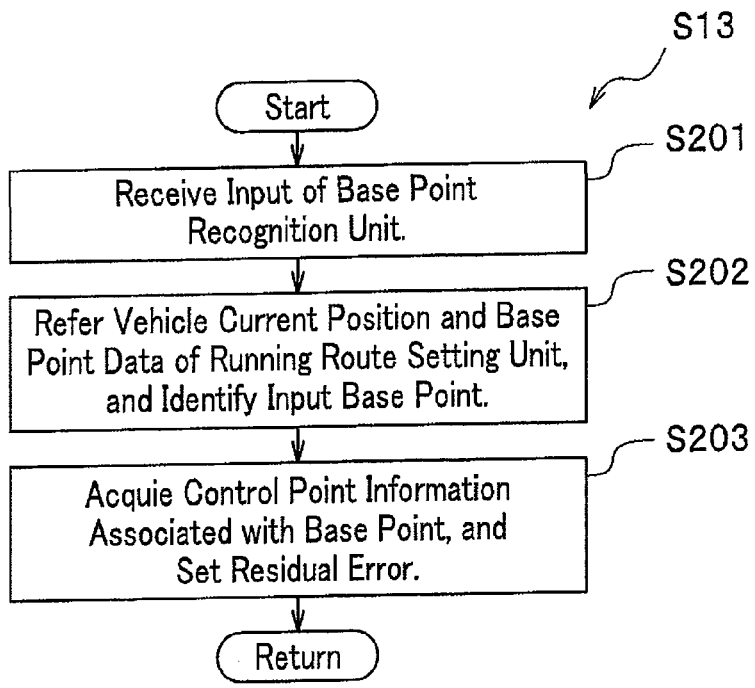
FIG. 8 is a flowchart showing a flow of a distance information obtaining processing to a next control point relating to the embodiment.

As shown in FIG. 8, firstly, the control point information obtaining unit 309 accepts the input of the base point recognition unit 324 (S201), and obtains the ground object at the base point. Next, the control point information obtaining unit 309 makes the current position of the vehicle V and the ground object at the base point to be search keys, the current position and the ground object are obtained from the hybrid navigation unit 322, and searches the base point data 303 obtained by the route setting unit 302. Then, out of many pieces of the base point data 303, the control point information obtaining unit 309 specifies a base point input this time (S202). Moreover, the control point information obtaining unit 309 acquires control point information associated with the base point and sets the residual error (S203). In addition, "Return" in the flowchart of FIG. 8 means that the processing returns to the main processing of FIG. 5 from the processing of the S13 thereof. Then according to the main processing of FIG. 5 described above, the S14 next to the processing of the S13 is called.

Next will be described the running distance measurement (S14) according to the autonomous navigation 103d.

The running situation monitoring unit 310 determines a running distance and a direction from the base point, based on information output by the driver's own vehicle speed detection unit 306 and the direction detection unit 307. Specifically, the running situation monitoring unit 310 determines the driver's own vehicle speed and direction according to a time, integrates their micro vectors, calculates a vehicle movement position, and determines a vehicle current position and a way to the current position.

The driver's own vehicle speed detection unit 306 may count a wheel speed pulse and detect the own vehicle speed; and also, may use an acceleration sensor, integrates the acceleration, and thereby determine the speed. Furthermore, an anti-braking control, a traction control, and a stability control are used for a vehicle stability; the detection unit 306 may also use the result of a driver's own vehicle speed determined from sensors used for the above controls, and the result of the own vehicle speed determined from a vehicle control computation.

The direction detection unit 307 detects the advancing direction of the driver's own vehicle. As the direction detection unit direction detection unit 307, a gyro sensor, a geomagnetic sensor, a steering angle sensor, and a yaw rate sensor can be used.

Figure 9:
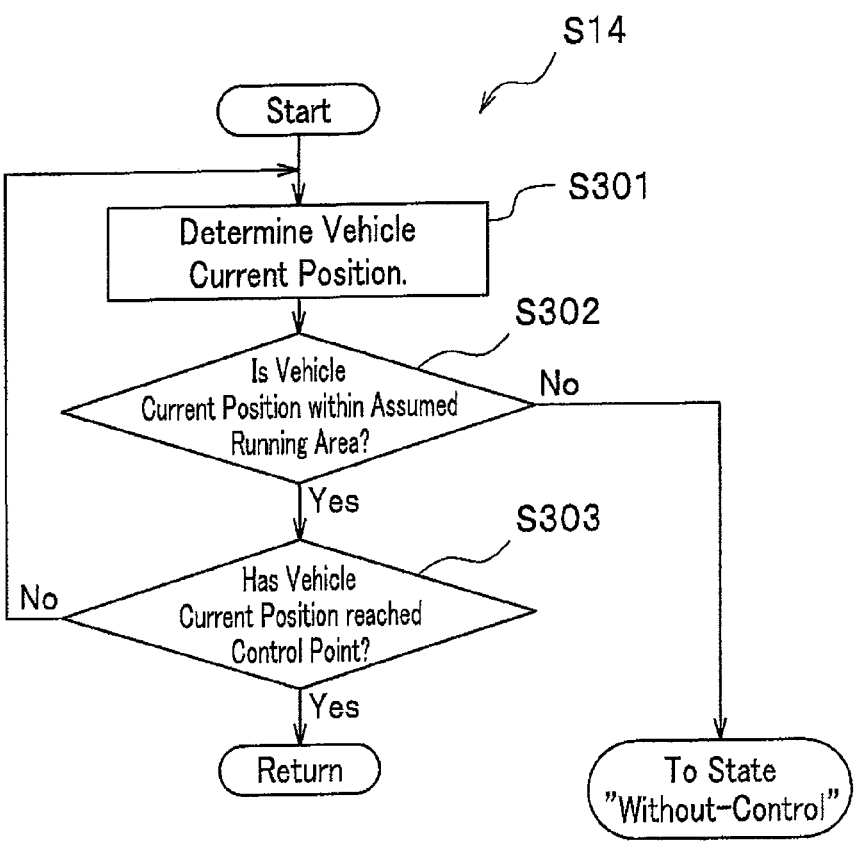
FIG. 9 is a flowchart showing a flow of a running situation monitoring processing to a next control point relating to the embodiment.

As shown in FIG. 9, firstly, the autonomous navigation unit 323 determines the vehicle current position according to the autonomous navigation 103d (S301). Specifically, the autonomous navigation unit 323 determines a unit-time distance vector from the vehicle speed and the direction from the base point, and determines the vehicle current position (equation 1) that is a cumulative-distance vector from the base point:

current position vector=base point position vector+ residual error vector+Σdriver's own vehicle speed x direction vector×ΔT,     Eq. 1 where ΔT is a unit time.

Here, the residual error vector is set by multiplying the residual error with the direction vector at the base point position. Moreover, the driver's own vehicle speed is integrated with respect to the time and the way (equation 2) is determined:

way=residual error+Σdriver's own vehicle speed×ΔT     Eq. 2

Next, the autonomous navigation unit 323 determines whether or not a determination condition of "the vehicle current position is within a range of an assumed running area" is satisfied (S302); if satisfied (Yes in the S302), the processing is changed to an S303; and if not satisfied (No in the S302), the processing is changed to a state "control cancel (without control)."

The purpose of the determination in the S302 is to check that the vehicle advances toward the destination. The determination is achieved, for example, by a calculation that the vehicle current position is not within the range of the assumed running area, when the length of a vertical line from the current position to the assumed running route is determined and the length is out of (larger than) its threshold (width of the assumed running area).

Figure 10:
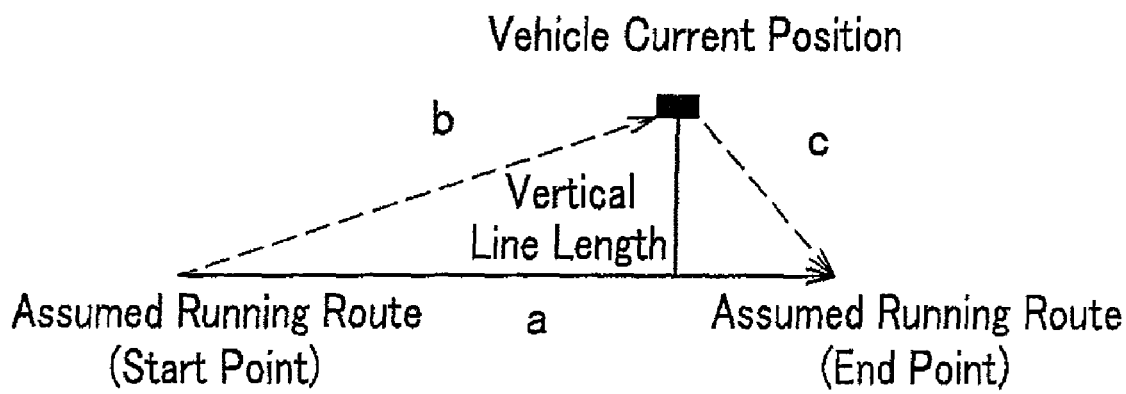
FIG. 10 is a drawing showing a method of determining a vertical line length relating to the embodiment.

As shown in FIG. 10, it is possible to calculate and determine the vertical line from the coordinates of a line segment of the assumed running route and those of the vehicle current position. An example is shown where the Hero's formula is used by focusing on the triangle area formed by the line segment of the assumed running route and the vehicle current position.

As shown in FIGS. 11A, 11B, 11C, and 11D, in some cases there are a plurality of assumed running areas according to the road shapes of the assumed running route such as (a) a straight line, (b) an intersection, (c) a curve, and (d) a T junction. In these cases a line segment (assumed running route) having a nearest start point and end point from the vehicle current position is selected, and thereby the length of the vertical line and the width of the assumed running area are determined.

Then the autonomous navigation unit 323 determines whether or not a determination condition of "the vehicle current position reaches the control point" is satisfied (S303); if satisfied (Yes in the S303), the processing returns to the S15; and if not satisfied (No in the S303), the processing is changed to the S301.

As the determination method in the S303, the data of a running distance and that of a way to the control point may be compared, and the coordinates of the vehicle current position and those of the control point may also be compared. It is desirable to use the data of the way in which the error of the direction detection is not entered in cases of: the data of the way being collected by practically driving a vehicle in advance; and the accuracy of the data of the way being higher, wherein the data of the way is determined from the calculation of a running route on a map.

Next will be described the vehicle control at the control point.

The control unit 308 obtains distance information to a next base point, monitors a running situation, and executes the vehicle control, based on the information of the route setting unit 302, the hybrid navigation unit 322, the base point recognition unit 324, the driver's own vehicle speed detection unit 306, and the direction detection unit 307.

The actuator control unit 311 executes controls such as a stop control at a stop line and a speed limit change, and drives the actuator 312. The actuator control unit 311 drives the actuator 312 according to an instruction from the control unit 308. As the actuator 312, the followings can be cited an engine 312a, a brake 312b, an AT (Automatic Transmission) 312c, and various alarm devices 312d.

Figure 12:
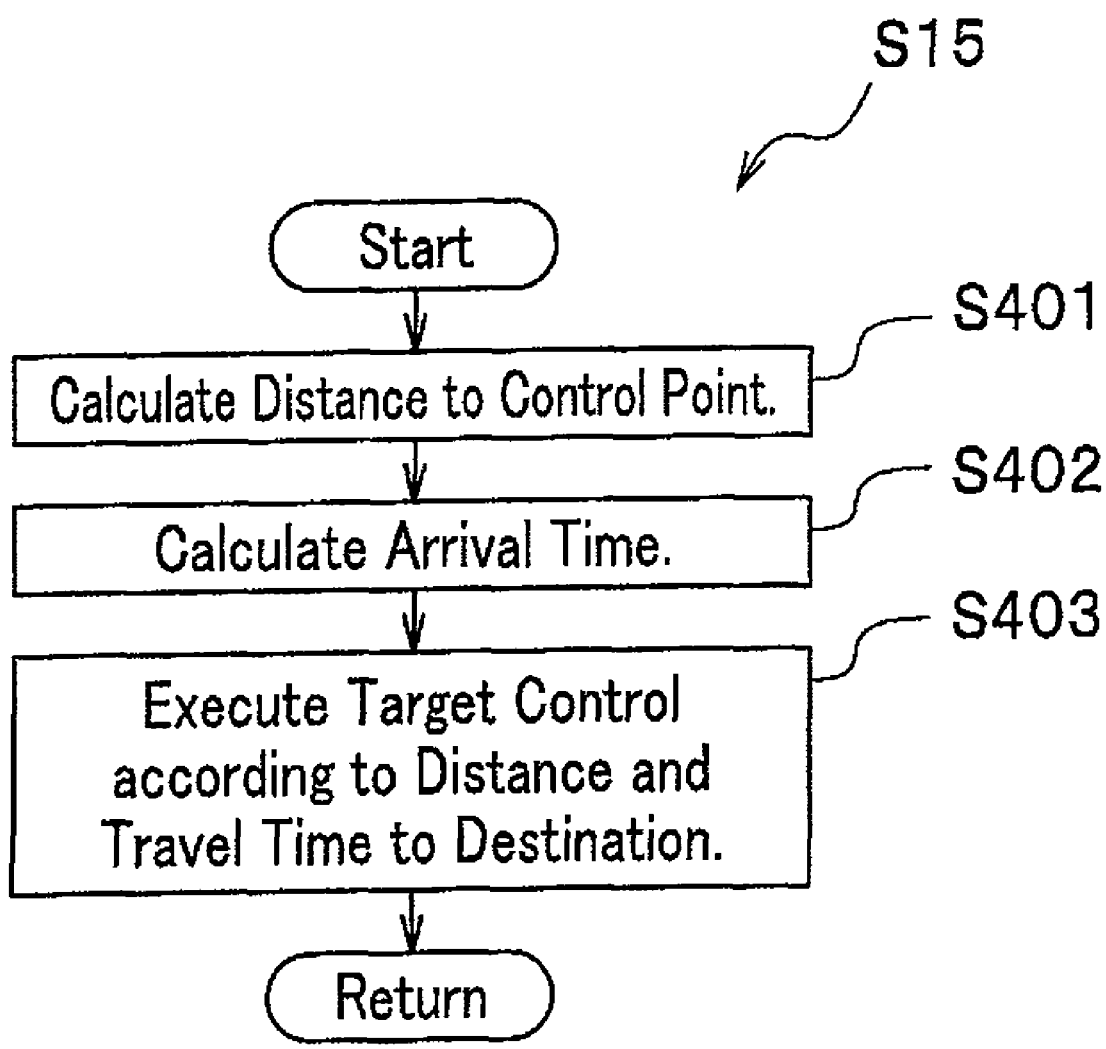
FIG. 12 is a flowchart showing a common processing of a control unit needed for a control relating to the embodiment.

As shown in FIG. 12, firstly, a distance to the control point is determined (S401). It is possible to determine the distance from a difference between the vehicle current position calculated by the autonomous navigation unit 323 through the autonomous navigation 103d and the control point obtained by the control point information obtaining unit 309.

The actuator control unit 311 determines an arrival time (S402). The arrival time is a distance and a driver's own vehicle speed to a target object set at the control point. The actuator control unit 311 executes a target control according to the distance and the arrival time to the target object.

TABLE 2

| Number | Control Target | Control Method |
| --- | --- | --- |
| (1) | Stop at Stop Line | Firstly, make the vehicle speed relative to the stop line "zero," and execute the |

TABLE 2-continued

| Number | Control Target | Control Method |
| --- | --- | --- |
| | | control so as to make the arrival time (distance and driver's own vehicle speed) to the stop line constant. Secondly, if the own vehicle speed becomes slow (for example, a few kilometers/h, change the control method, control the brake actuator through the open control where the reaction time and stop distance of the actuator are considered, and thereby stop the vehicle at the stop line |
| (2) | Speed Limit Change | When the vehicle reaches the control point, adjust the upper speed limit with a new speed limit. |
| (3) | Deceleration before Curve | Give a target vehicle speed to keep a lateral acceleration, depending on the curvature radius of a curve. |
| (4) | Branch Instruction | If the target arrival time (distance and driver's own vehicle speed) to the intersection is reached, issue an instruction to the man-machine interface. The branch alarm may be output, depending on the distance to the start of the branch road, and also on the arrival time at the road. The guidance for prompting any one of a left turn and a right turn can be achieved by the method similar to the branch alarm. |
| (5) | Corner Video Camera Control | Activate the corner video camera automatically at such a T junction and an intersection, display such a vehicle from a side, and thereby call attention. |

Table 2 shows the control target and the control method executed by the actuator control unit 311.

Figure 13:
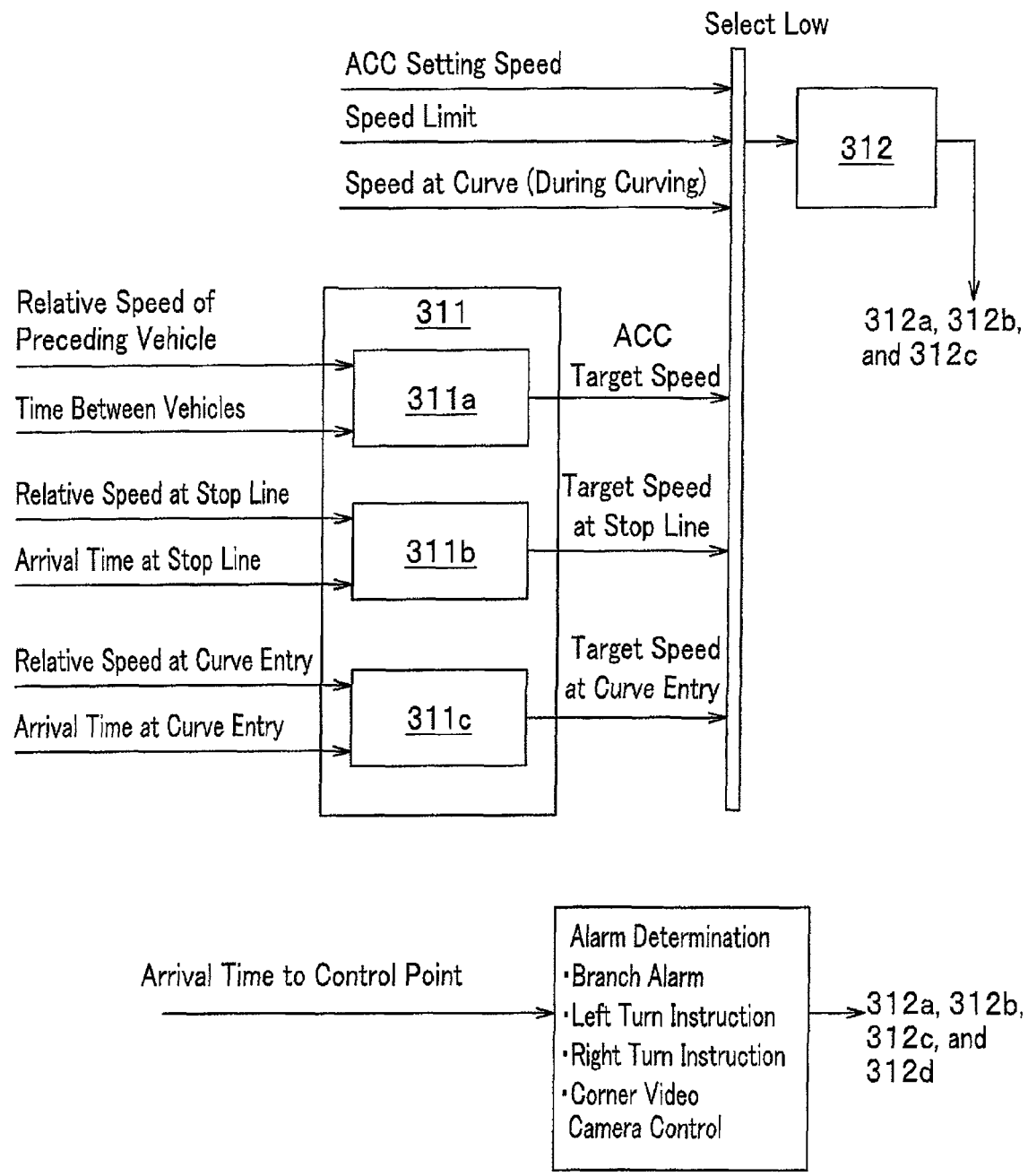
FIG. 13 is a control block diagram showing a control method associated with a control target relating to the embodiment.

As shown in FIG. 13, the actuator control unit 311 comprises a headway distance control unit 311a, a stop line control unit 311b, a curve-entry-control unit 311c.

Such a control method for making the arrival time constant as the control method (1) in Table 2 is assumed to be used together with an ACC (Adaptive Cruise Control System). Specifically, in the ACC, by using a control method for making a speed relative to a preceding vehicle "zero" in following the preceding vehicle, and making a set arrival time (headway distance and driver's own vehicle speed) constant, it is possible to achieve the control method for making the arrival time constant.

In the ACC the computation of a headway distance control is executed, based on a preceding-vehicle relative speed and the arrival time, and thereby the target speed of the ACC is determined. The actuator control unit 311 selects a smaller one out of the target speed and an ACC set speed set by a driver ("select low"), and sends the smaller one to the actuator 312. The actuator 312 controls the engine 312a, the AT 312b, and the brake 312c so that the vehicle comes into a constant speed. In addition to the headway distance control unit 311a, as shown in FIG. 13, the stop line control unit 311b is added. Then selecting three of the target speed according to the stop line, the ACC set speed, and the ACC target speed, the ACC may give them to the actuator 312.

The "Speed Limit Change" of the control method (2) in Table 2 corresponds to an ACC set target speed change of a conventional technology, and it is possible to add the input of the speed limit in FIG. 13. The speed change after the target speed change is achieved smoothly and without giving uncomfortable feeling to a driver.

Next will be described the control method (3) of "Deceleration before Curve" in Table 2. With respect to a lateral acceleration (lateral G) at a curve, the design speed and curvature radius of the curve are defined in the article 15 (curvature radius) of the Road Structure Ordinance.

Figure 14:
FIG. 14 is an illustration drawing showing the Road Structure Ordinance and a calculated lateral acceleration relating to the embodiment.

As shown in FIG. 14, the lateral G is limited to about 2.5 G. A target speed is controlled so that the lateral G is within a range of each lateral acceleration constant. With respect to a deceleration method, a relative speed difference is determined between a current vehicle speed and a vehicle speed at a curve entry position, and then the ACC control may be used. Specifically, in FIG. 13 the deceleration method can be achieved by adding the curve entry control unit 311c. In a scene on the way of the curve, it is available to add a vehicle speed at a curve, where the lateral G is considered, to the option of the "select low" of the vehicle speed control.

With respect to the control timing of the corner video camera in the control method (5) of Table 2, the control may be started when the arrival time becomes equal to a control start time (=operation time of corner video camera+time delay).

Thus mainly referring to FIG. 5, the details of the route setting (S11) to the vehicle control in the control point (S15) have been described.

In executing the autonomous navigation 103d, the learning function of the autonomous navigation 103d may be used. Conventionally, in a car-navi (car navigation) a vehicle speed is determined mainly by multiplying a vehicle speed pulse with a coefficient equivalent to the wheel radius. The coefficient is adapted to be always learned, for example, by comparing vehicle direction change operations of a left turn, a right turn, and a curve with reference positions on the map. Accordingly, in the autonomous navigation 103d, because the learning of the coefficient is always executed, it is possible to reduce an error, for example, less than 1%, after an initial position is once adjusted. Accordingly, by using the autonomous navigation 103d, it is possible to reduce a variation when a vehicle runs a same course a plurality of times.

Furthermore, in the autonomous navigation 103d a complementary function of using a sensor may be used. In a case of a tire idly rotating, depending on an environment condition, it is possible to correct the vehicle speed to a proper vehicle speed by referring to other wheel speeds, an acceleration sensor, and an absolute vehicle speed sensor.

Here will be described using a function of determining the vehicle current position, and a correction function of the current position by the map matching of the car-navi at the same time. When the vehicle current position after the map matching processing is used for the vehicle control, an error of the map and that of the map matching result are reflected in the current position, and the vehicle is not always arranged on the road continuously. Thus forcibly executing the map matching causes the accuracy of the vehicle current position to worsen on the contrary, and inadequately acts on the vehicle control. Therefore, conventionally, when a route is not certain, the vehicle control is adapted to be cancelled soon.

Furthermore, the processings S12 to S15 may be continuously (repeatedly) executed for one route setting (S11). Here will be described a repeatedly executed example.

By simulating a route, it is possible to check that a plurality of base points and control points exist in the route in advance (before running). For example, as shown in FIG. 6A, if base points and control points are arranged so that a next base point "2" is recognized before a control point "1" is reached after the recognition of a base point "1," a control flow associated with the base point recognition is continuously executed. In continuously executing the processings S12 to S15, the route setting to the destination may be executed, and then, the base points and the control points may be selected.

Particularly when a route is fixed, a lacking base point and control point may be checked and reflected in the map data 301 in addition to a base point and a control point that are already registered. By repeatedly executing an actual running, it is possible to further achieve an enhancement and to execute a stable running. When there exist a plurality of vehicle controls (for example, "stop at stop line" and "corner video camera control"), it is possible to execute both, and also to choose and execute one of the both.

Furthermore, although the scene of recognizing a plurality of base points before arrival at the control point after the recognition of the base point is considered, the data of a base point lastly recognized may also be adopted.

Each stop line in FIGS. 15A, 15B, 15C, 15D, and 15E is an example of a base point. The rear video camera 305b is mounted on the vehicle V. In addition, each two-dimensional graph on the right side shows the coordinate position of the vehicle V as a black circle or an arrow mark, and shows the coordinate position of a stop line as a white circle.

Figure 15A:
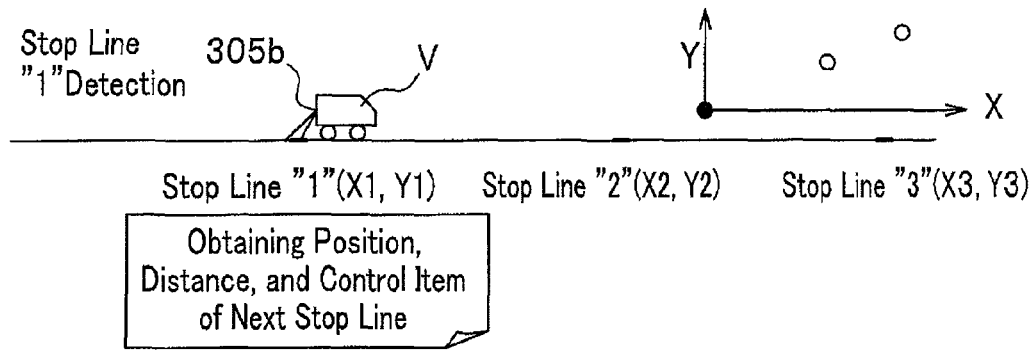
FIGS. 15A, 15B, 15C, 15D, and 15E are illustration drawings respectively showing scenes to continuously execute a control to a continuous stop line control (rear video camera) relating to the embodiment.
Figure 15B:
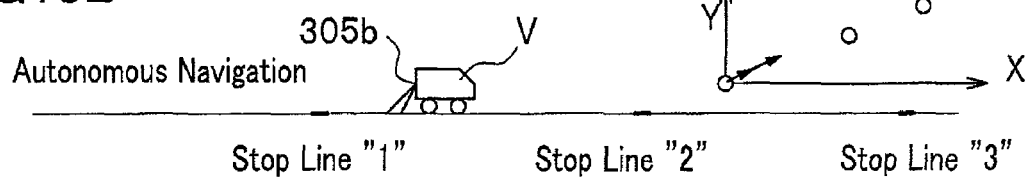
Figure 15C:
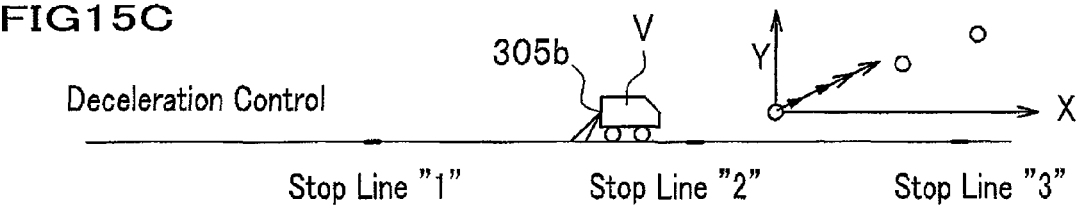
Figure 15D:
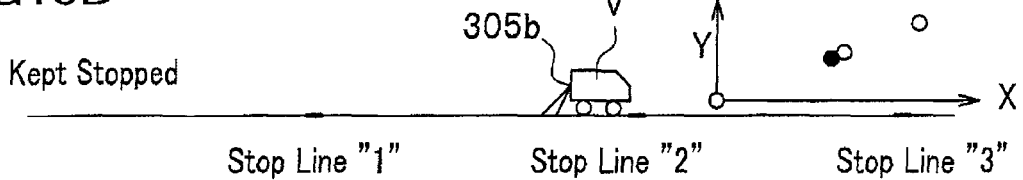

In the 'stop line "1"' detection' of FIG. 15A, the stop line "1" is detected by the rear video camera 305b, and then stop control information is obtained as the position, distance, and control information of the next stop line "2." In the "autonomous navigation 103d" of FIG. 15B, then the running of the vehicle V is started and its position is obtained according to the autonomous navigation 103d. In the "deceleration control" of FIG. 15C, when the vehicle V reaches near the stop line "2," the deceleration of the vehicle V is started. In the "kept stopped" of FIG. 15D, the stop control of the vehicle V is executed at the position of the stop line "2."

Figure 15E:
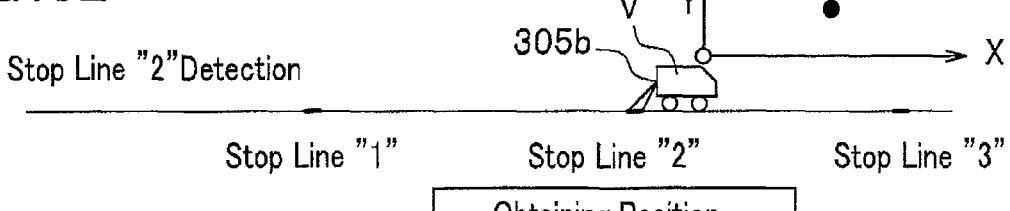

In the 'stop line "2" detection' of FIG. 15E, the running of the vehicle V is started, the base point of the stop line "2" is recognized and stop control information is obtained as the position, distance, and control information of the next stop line "3." In this example of FIGS. 15A-15E there exist a base point and a control point at a same position, and therefore, it is not possible to recognize the stop line "2" of the next base point before the vehicle V stops at the stop line "2." However, it is possible to recognize the stop line "2" with the rear video camera 305b from the stop state of the vehicle V at the stop line "2" just after the running of the vehicle V is started. Accordingly, even when the position of a base point and that of a control point are same, it is possible to execute a series of continual processings.

In FIGS. 16A, 16B, 16C, and 16D, each two-dimensional graph on the right side shows the coordinate position of the vehicle V as a black circle or an arrow mark, and shows the coordinate position of a stop line as a white circle. As shown in FIGS. 16A, 16B, 16C, and 16D, the front video camera 305a is mounted on the vehicle V. Although the example of the rear video camera 305b has been described in FIGS. 15A-15E, the vehicle V can be more accurately stopped at a stop line by using the front video camera 305a.

Figure 16A:
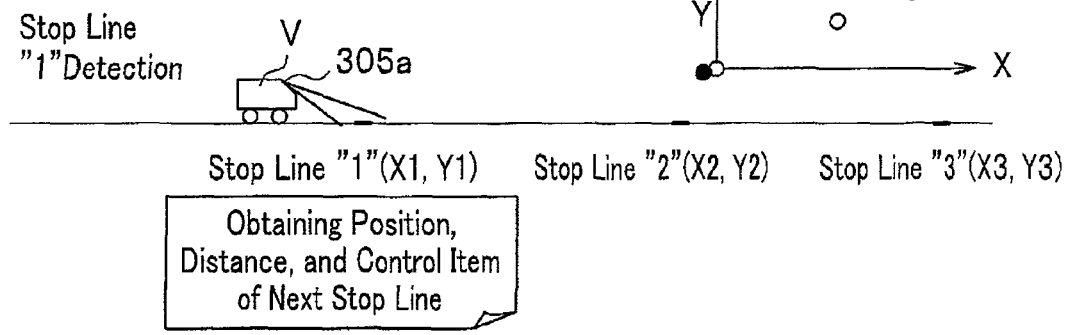
FIGS. 16A, 16B, 16C, and 16D are illustration drawings respectively showing scenes to continuously execute a control to a continuous stop line control (front video camera) relating to the embodiment.
Figure 16B:
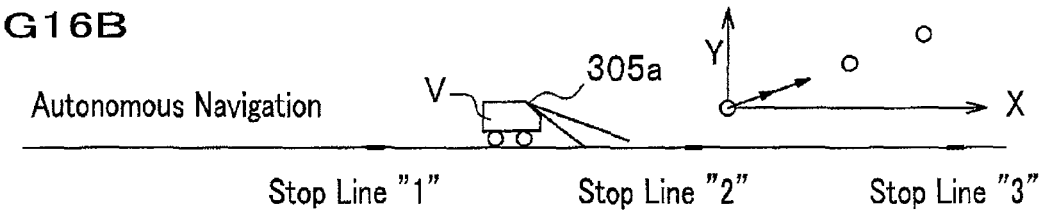

In the 'stop line "1" detection' of FIG. 16A, the stop line "1" is detected by the front video camera 305a, and then stop control information is obtained as the position, distance, and control information of the next stop line "2." In the "autonomous navigation 103d" of FIG. 16B, the running of the vehicle V is started and its position is obtained according to the autonomous navigation 103d.

Figure 16C:
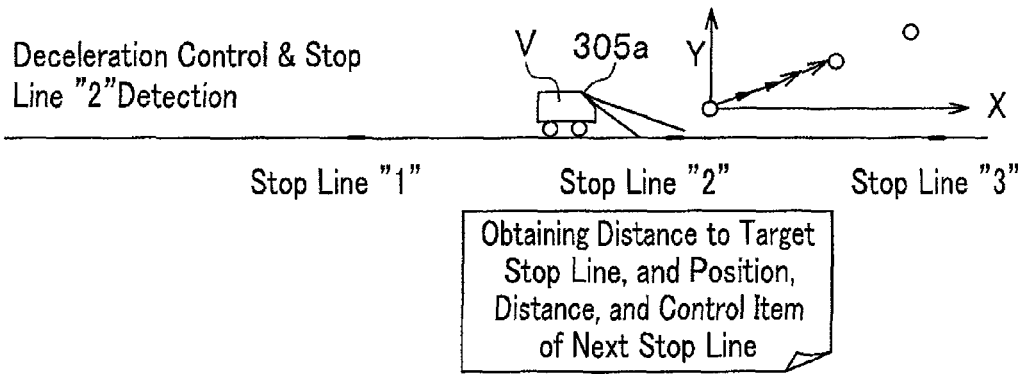

Next will be described the 'deceleration control & stop line detection "2"' of FIG. 16C. When the vehicle V arrives near the stop line "2," the deceleration of the vehicle V is started. When the stop line "2" is found by the front video camera 305a, a distance to the stop line "2" is detected, the stop line "2" is recognized as the base point, and the position, distance, and control information of the stop line "3" is obtained.

Here, from a time when the stop line recognition is made possible by the front video camera 305a, it is requested to adopt the distance to the stop line "2" recognized by the front video camera 305a instead of a distance to a stop line determined from the autonomous navigation 103d. When the stop line "2" is found, the distance to the stop line "2" is obtained, the stop line "2" is recognized as the base point, and the position, distance, and control information of the stop line "3" is obtained.

Figure 16D:
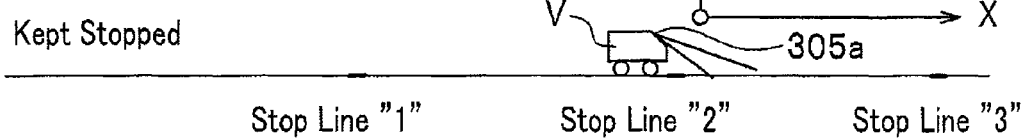

In the "kept stopped" of FIG. 16D, the stop control of the vehicle V at the stop line "2" is executed, based on the position information of the stop line "2" by the front video camera 305a.

What is claimed is:

1. A vehicle control system comprising:
    a route setting unit configured to set a route from a start point to a destination;
    an information obtaining unit configured to obtain from a memory position information of at least one base point and at least one control point existing in the route set by the route setting unit;
    a base point recognition unit configured to recognize that a current position of a vehicle reaches a position of the base point obtained by the information obtaining unit;
    a running situation monitoring unit configured to determine as a predetermined distance a running distance from the base point most lately recognized by the base point recognition unit; and
    a control unit configured to execute a control to the vehicle if the predetermined distance determined by the running situation monitoring unit is shorter than any of a first threshold distance and a second threshold distance, when the current position of the vehicle reaches a position of the control point obtained by the information obtaining unit, wherein the first threshold distance is shorter than the second threshold distance, and wherein vehicle control that needs a higher position accuracy is executed before a first threshold distance is reached.

2. The vehicle control system according to claim 1, wherein the information obtaining unit obtains a plurality of the base points and a plurality of the control points, and the control unit executes vehicle controls at the control points a plurality of times.

3. The vehicle control system according to claim 1, wherein the information obtaining unit obtains the position information of the base point and the control point from a navigation system mounted on the vehicle.

4. The vehicle control system according to claim 1, wherein when the predetermined distance is shorter than the second threshold distance, the control unit detects a current position of the vehicle according to an autonomous navigation, and wherein when the predetermined distance is equal to or longer than the second threshold distance, the control unit detects a current position of the vehicle according to a hybrid navigation.

5. The vehicle control system according to claim 1, wherein the base point recognition unit recognizes the vehicle arriving at a position of a base point through a ground object photographed by a video camera mounted on the vehicle.

6. The vehicle control system according to claim 1, wherein the base point recognition unit recognizes the vehicle arriving at a position of a base point through a radio wave received from a beacon near the vehicle.

7. The vehicle control system according to claim 1, wherein the control unit controls at least one of a stop at a stop line, a speed change, a deceleration before a curve, a turn signal, and a following of a preceding vehicle.

8. A vehicle control method through a computer in a vehicle control system including a route setting unit, an information obtaining unit, a base point recognition unit, a running situation monitoring unit, and a control unit, the vehicle control method comprising the steps of
    the route setting unit setting a route from a start point to a destination;
    the information obtaining unit obtaining from a memory position information of at least one base point and at least one control point existing in the route set by the route setting unit;
    the base point recognition unit recognizing that a current position of a vehicle reaches a position of the base point obtained by the information obtaining unit;
    the running situation monitoring unit determining as a predetermined distance a running distance from the base point most lately recognized by the base point recognition unit; and
    the control unit executing a control to the vehicle if the predetermined distance determined by the running situation monitoring unit is shorter than any of a first threshold distance and a second threshold distance, when the current position of the vehicle reaches a position of the control point obtained by the information obtaining unit, wherein the first threshold distance is shorter than the second threshold distance, and wherein vehicle control that needs a higher position accuracy is executed before a first threshold distance is reached.

9. A vehicle control program stored on a non-transitory computer readable medium for a vehicle control system including a route setting unit, an information obtaining unit, a base point recognition unit, a running situation monitoring unit, and a control unit, the vehicle control program making a computer execute the steps of:
    the route setting unit setting a route from a start point to a destination;
    the information obtaining unit obtaining from a memory position information of at least one base point and at least one control point existing in the route set by the route setting unit;
    the base point recognition unit recognizing that a current position of a vehicle reaches a position of the base point obtained by the information obtaining unit;
    the running situation monitoring unit determining as a predetermined distance a running distance from the base point most lately recognized by the base point recognition unit; and
    the control unit executing a control to the vehicle if the predetermined distance determined by the running situation monitoring unit is shorter than any of a first threshold distance and a second threshold distance, when the current position of the vehicle reaches a position of the control point obtained by the information obtaining unit, wherein the first threshold distance is shorter than the second threshold distance, and wherein vehicle control that needs a higher position accuracy is executed before a first threshold distance is reached.

* * * * *